United States Patent [19]

Stahl

[11] Patent Number: 4,884,666
[45] Date of Patent: Dec. 5, 1989

[54] TORSIONAL DAMPER AND MOUNTING ADAPTER

[76] Inventor: Carl R. Stahl, 3248 Fairbanks Cove, Memphis, Tenn. 38128

[21] Appl. No.: 302,360

[22] Filed: Jan. 27, 1989

[51] Int. Cl.⁴ ............................................ B60K 17/22
[52] U.S. Cl. ...................................... 188/378; 74/574; 180/381; 403/292; 464/180
[58] Field of Search .................... 188/378; 267/154; 180/73.1, 75.2; 464/179, 180, 182; 74/573 F, 573 R, 574; 403/292, 298

[56] References Cited

U.S. PATENT DOCUMENTS

| | | | |
|---|---|---|---|
| 139,932 | 1/1873 | Sweetland | 403/298 X |
| 2,724,983 | 11/1955 | O'Connor | 468/180 |
| 3,555,926 | 1/1971 | Moorhouse et al. | 188/378 X |
| 4,691,818 | 9/1987 | Weber | 403/292 X |

FOREIGN PATENT DOCUMENTS

| | | | |
|---|---|---|---|
| 3020234 | 12/1981 | Fed. Rep. of Germany | 74/574 |
| 3234865 | 3/1984 | Fed. Rep. of Germany | 464/180 |

Primary Examiner—Andres Kashnikow
Assistant Examiner—Matthew C. Graham
Attorney, Agent, or Firm—Woodard, Emhardt, Naughton, Moriarty & McNett

[57] ABSTRACT

An assembly for dampening shaft vibration and noise. An annular torsional damper is fixedly mounted to a cylindrical flange of a mounting adapter. The opposite ends of the adapter are cylindrically shaped and extend into the adjacent ends of a pair of shafts which are affixed thereto.

15 Claims, 2 Drawing Sheets

TORSIONAL DAMPER AND MOUNTING ADAPTER

BACKGROUND OF THE INVENTION

1. Field of the Invention

This invention is in the field of devices for dampening shaft vibration and noise.

2. Description of the Prior Art

Engine or driven component excited torsionals can result in unacceptable noise and premature torsional fatigue failure of transmissions of drive line components. Viscous type torsional dampers have therefore been developed to attenuate the noise and vibration. I have discussed the development and effects of viscous type dampers in SAE Technical Paper Series 880823. An article entitled "Dealing with Torsional Vibration in Vehicle Drive Lines", published in the April, 1988 publication *Diesel Progress North American* discusses my efforts to effectively develop solutions to the vibration problem. The prior art includes a number of torsional dampers attachable to a shaft with a torsional damper including an annular housing containing a viscous damper.

In order to increase operating efficiency, the vehicle weight has been decreased resulting in increased torsional fatigue and premature drive line failure. The torsionals are not eliminated by simply increasing the weight and size of drive train components since the torsional stress is simply transferred to the weakest point again resulting in premature failure. As a result, there is a greater need for torsional dampers installed as original equipment as well as retrofit applications on existing shafts.

Torsional dampers are typically mounted to the output shaft of the transmission. The shaft is provided with a flange positionable against one side of the torsional damper with a second flange positioned on the opposite sides of the damper which in turn is attached to the drive shaft. The two flanges are then bolted together "sandwiching" and holding the torsional damper therebetween. In many cases, the adapter flanges are not available particularly for in-field mounting of a torsional damper to an existing vehicle. Further, the drive shaft flanges available are of a variety of configurations which may or may not be accommodated by the selected torsional damper. I have therefore devised an adapter allowing for quick field and or original equipment manufacture installation of a torsional damper. The adapter having a damper mounted thereto may be located at any point along the drive shaft simply by cutting the shaft and inserting the adapter in the cut with the shaft then being welded to the opposite sides of the adapter. The adapter is particularly advantageous in that it provides a means to transfer power from the shaft at a point other than the shaft end.

SUMMARY OF THE INVENTION

One embodiment of the present invention is a torsional damper assembly for mounting between a first shaft and a second shaft to attenuate shaft vibration and noise comprising a housing having a ring shaped sealed cavity, an annular inertia weight rotatably mounted in the cavity in unattached, concentric and slidable relationship therewith and defining a clearance therebetween, a bearing retained between the housing and the inertia weight and within the clearance to function as a medium to dampen shaft torsional vibration and noise, a bracket attached to the housing and located radially inward of the cavity and the annular weight, and, an adapter having a one piece main body which includes: a flange directly attachable to the bracket and to secure the adapter to the housing and limit motion therebetween, a first mount integral with the flange and directly engageable with the first shaft to fixedly secure the adapter to the first shaft to limit longitudinal and lateral motion therebetween, and, a second mount integral with the flange and directly engageable with the second shaft to fixedly secure the adapter to the second shaft to limit longitudinal and lateral motion therebetween.

Another embodiment of the present invention is an adapter for mounting a torsional damper between a first shaft and a second shaft to attenuate shaft vibration and noise comprising a flange directly attachable to a torsional damper to secure the adapter to the damper and limit motion therebetween, a first mount integral with the flange and directly engageable with a first shaft to fixedly secure the adapter to the first shaft to limit longitudinal and lateral motion therebetween, and, a second mount integral with the flange and directly engageable with a second shaft to fixedly secure the adapter to the second shaft to limit longitudinal and lateral motion therebetween.

It is an object of the present invention to provide a new and improved for mounting a torsional damper to a drive line.

A further object of the present invention is to provide a torsional damper assembly which may be easily mounted in original equipment manufactured vehicles or in used vehicles.

In addition, it is an object of the present invention to provide a shaft assembly having dampened shaft vibration and noise including a mounting adapter for securing a damper to shafts.

Related objects and advantages of the present invention will be apparent from the following description.

DESCRIPTION OF THE PREFERRED EMBODIMENT

Figure 1:
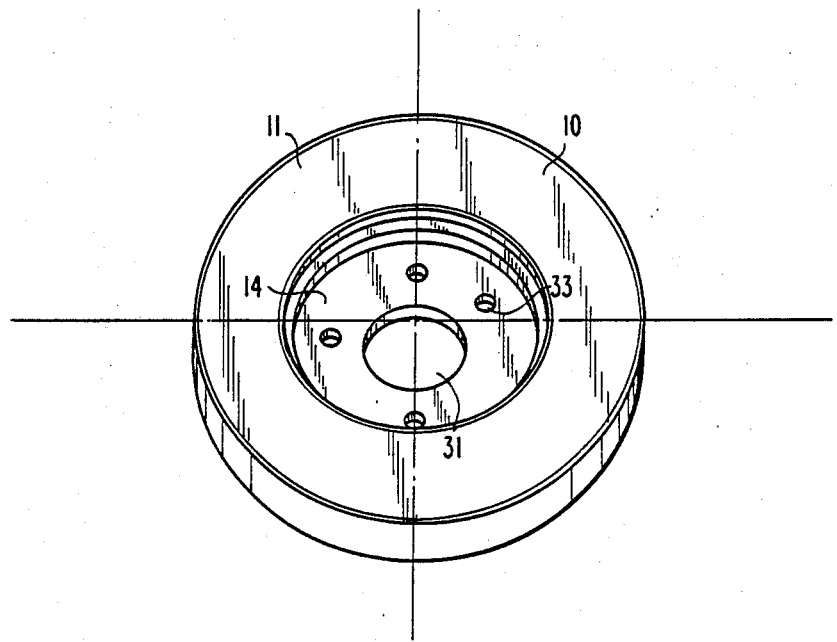
FIG. 1 is a perspective view of a torsional damper.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a torsional damper 10 having an annular housing 11 with an annular inertia weight 12 rotatably mounted therein. Inertia weight 12 is mounted in housing 11 in an unattached, concentric and slidable relationship with the housing. A clearance 13 exists between inertia weights 12 and housing 11 and completely surrounds the inertia weight. A viscous fluid provided within clearance 13 provides a bearing spacing apart the inertia weight and housing and allowing the inertia weight to slide relative to the housing. Alternatively, the bearing may take the form of a plastic sheet or roll bearing in lieu of a viscous liquid or fluid filling the clearance between the inertia weight and housing. The bearing filling clearance 13 functions as a medium to dampen torsional vibration and noise which is applied to housing 11 by the engine, transmission and other power train components. The bearing in the form a viscous damping fluid, such as silicon fluid, acts as a shear film coupling the inertia weight and housing. Normally, the inertia weight will rotate together with the housing at the drive shaft rotational speed. Changes in the rotational speed which cause vibrations are transmitted to the housing whereas the inertia weight will tend to continue to rotate at a constant speed. As a result, any vibrations are dampened by the drag of the viscous fluid separating the inertia weight from the housing. Housing 11 includes a wall or plate 14 attached thereto which extends partially across the central opening of the housing. Wall 14 is arranged perpendicularly to the rotational axis 15 of the shafts attached to the torsional damper with the axis also extending centrally through housing 11. Housing 11, inertia weight 12 and the bearing within clearance 13 forms a part of the prior art with such dampers also including a wall extending across the inside diameter of housing 11 to facilitate mounting of the damper to the rotatable shafts. Such a damper is disclosed in my abandoned U.S. patent application Ser. No. 111,824 filed Jan. 14, 1980.

Figure 2:
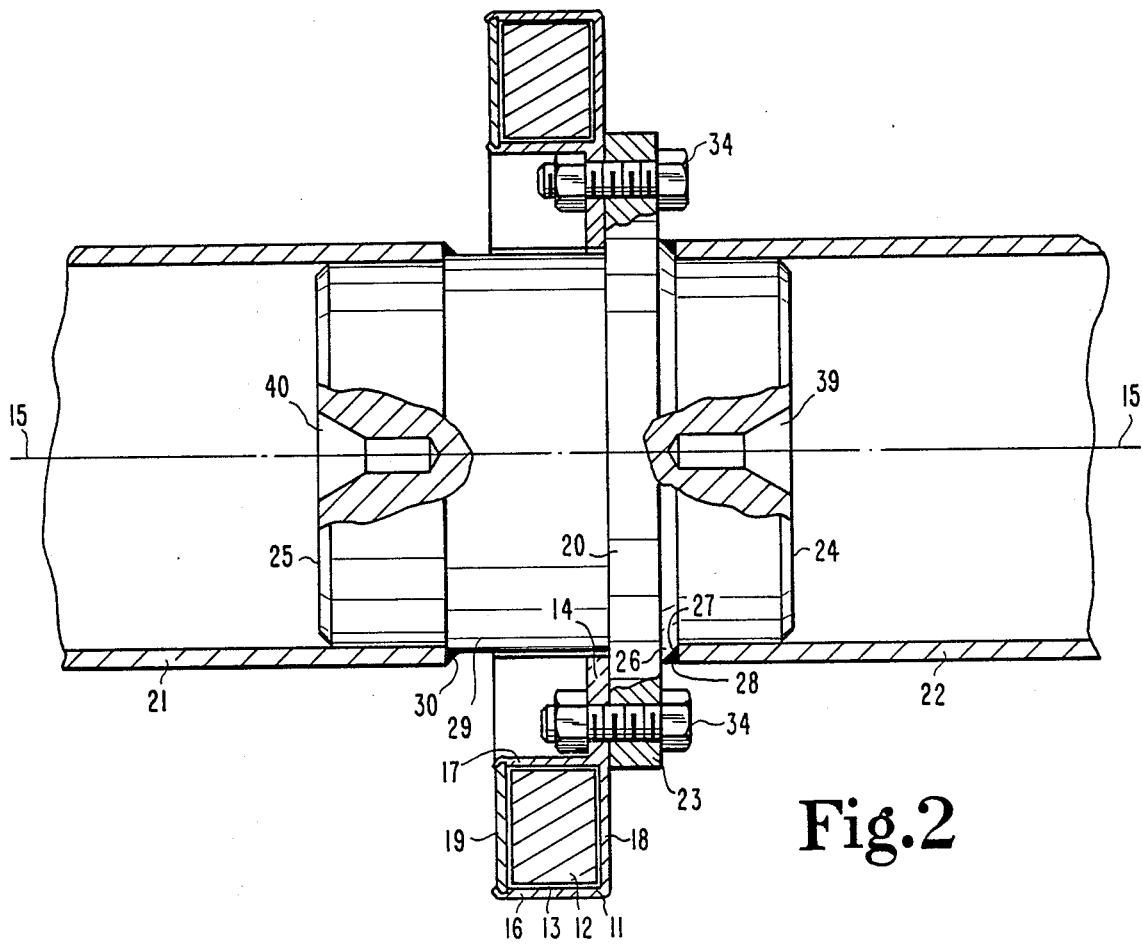
FIG. 2 is a fragmentary, cross-sectional view showing the damper of FIG. 1 assembled to a mounting adapter secured between a pair of shafts.

In the torsional damper shown in FIG. 2, housing 11 includes a pair of parallel side walls 16 and 17 integrally joined to wall 18 perpendicularly arranged relative to axis 15 and in turn integrally joined to cross wall 14. The cavity formed by walls 16 through 18 opens outwardly to the left as viewed in FIG. 2 with the cavity being closed by a ring shaped wall 19 mounted to and sealed to the left ends of walls 16 and 17.

My new mounting adapter 20 extends into and is attached to the ends of aligned drive shafts 21 and 22 with damper 10 being affixed by bolts 34 to a disk-shaped flange 23 positioned between the pair of shafts. Mounting adapter 20 is of a one-piece construction and includes a first cylindrical portion 24 and a second cylindrical portion 25 extending in opposite directions and having rotational axis 15 extending centrally therethrough. Cylindrical portions 24 and 25 are of equal diameter and extend into the open ends, respectively, of shafts 22 and 21. A cylindrical ring 26 is integrally fastened between cylindrical portion 24 and flange 23 and has an outside diameter slightly greater than cylindrical portion 24 providing a beveled surface 7 upon which the end of shaft 22 abuts and is fastened thereto by a weld 28 or other suitable means. Likewise, a cylindrical extension 29 is positioned between cylindrical portion 25 and flange 23 and has an outside diameter greater than cylindrical portion 25. Extension 24 abuts against the end of shaft 21 which is secured thereto by a weld 30 or other suitable fastening means. The cylindrical portions 24 and 25 along with the ring 26 and extension 29 provide a mounting means for the shafts when secured to the shafts by welding. These mounting means limit longitudinal and lateral motion between shafts 21 and 22, and the mounting adapter 20.

Cross wall 14 has an aperture 31 extending therethrough having a diameter greater than the diameter of extension 29. Thus, the torsional damper 10 may be mounted to adapter 20 by positioning extension 29 through aperture 31 prior to the attachment of shaft 21 to the extension. Wall 18 is positioned adjacent cylindrical mounting flange 23 which has a diameter greater than the shafts attached to the adapter. A plurality of bolt holes 32 are provided on flange 23 and are alignable with the bolt holes 33 provided on wall 14. A plurality of fastening devices may then be extended through holes 32 and 33 fixedly securing the damper to the adapter 20.

Figure 3:
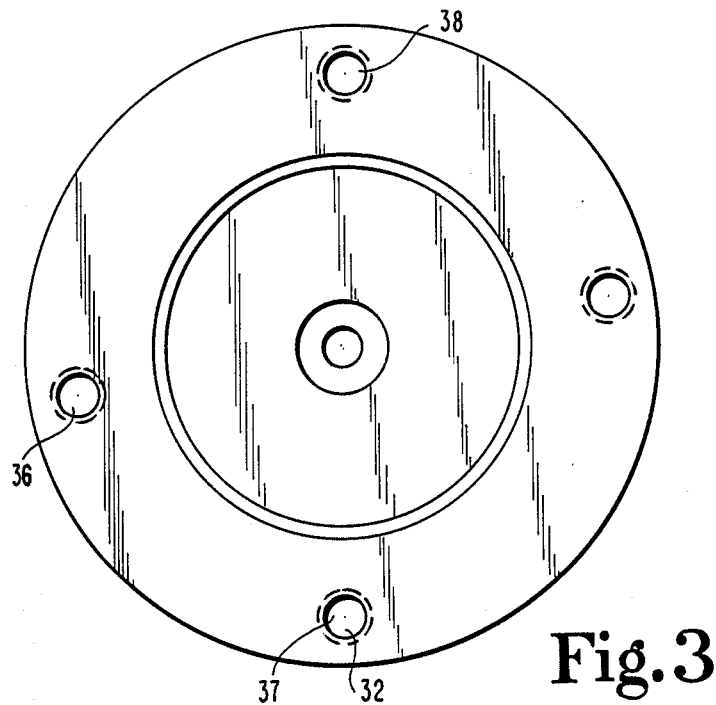
FIG. 3 is a right hand end view of the mounting adapter of FIG. 2 without the shafts or torsional damper secured thereto.

In the embodiment shown in FIG. 3, the top and bottom bolt holes 32 are located on the vertical axis of the adapter whereas the side bolt holes are offset relative to the horizontal axis. Thus, bolt holes 36 and 37 are located approximately 80° apart relative to the axis of rotation whereas bolt holes 36 and 38 are located 100° apart relative to the same axis.

A pair of counter sunk blind holes 39 and 40 are provided, respectively, on cylindrical portions 24 and 25 with axis 15 extending centrally through holes 39 and 40. The counter sunk holes provide a chuck receiving means located on the axis 15 to allow the adapter to be held in cantilevered fashion while either shaft is affixed to the adapter at the opposite cylindrical portion from the cylindrical portion held. That is, a lathe chuck holding a threaded member may be extended threadingly into hole 39 thereby holding the adapter in cantilevered fashion while shaft 21 is affixed to extension 29. Alternatively, the chuck may be extended into hole 40 and secured thereto while shaft 22 is affixed at the opposite end of the adapter.

The adapter when attached to the torsional damper and a pair of shafts is particularly unique in view of the one piece integral construction of the adapter. The adapter is particularly useful in that a shaft may be cut at any location along the length thereof, and the adapter with torsional damper inserted within the cut and affixed to the adjacent ends of the cut shaft.

The mounting adapter is particularly advantageous in that extension 29 may be positioned to the left or right as viewed in FIG. 2 to thereby position the torsional damper in such a way that the damper and attached mounting flange does not interfere with the vehicle frame holding the drive shafts. The countersunk holes provided centrally on the opposite cylindrical portions of the adapter provide a fastening receptacle for attachment of a flat plate in the event a shaft is not to be affixed to one end. The flat plate in turn may hold a power take off device such as a sprocket.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A torsional damper assembly for mounting between a first shaft and a second shaft to attenuate shaft vibration and noise comprising:
a housing having a ring shaped sealed cavity;
an annular inertia weight rotatably mounted in said cavity in unattached, concentric and slidable relationship therewith and defining a clearance therebetween;

bearing means retained between said housing and said inertia weight and within said clearance to function as a medium to dampen shaft torsional vibration and noise;

bracket means attached to said housing and located radially inward of said cavity and said annular weight; and, an adapter having a one piece main body which includes:
  flange means directly attachable to said bracket means and to secure said adapter to said housing and limit motion therebetween;
  first mounting means integral with said flange means and directly engageable with said first shaft to fixedly secure said adapter to said first shaft to limit longitudinal and lateral motion therebetween; and,
  second mounting means integral with said flange means and directly engageable with said second shaft to fixedly secure said adapter to said second shaft to limit longitudinal and lateral motion therebetween.

2. The torsional damper assembly of claim 1 wherein:
said first mounting means includes a first cylindrical portion and said second mounting means includes a second cylindrical portion integrally attached to said first cylindrical portion and aligned along the same axis of rotation with said first cylindrical portion extendable into said first shaft and said second cylindrical portion extendable into said second shaft.

3. The torsional damper assembly of claim 2 wherein:
said adapter further includes an extension located integral with and between said first cylindrical portion and said flange means, said extension is sized to receive said housing between said first cylindrical portion and said flange means with said housing extending circumferentially around said extension.

4. The torsional damper assembly of claim 3 wherein:
said first cylindrical portion and said second cylindrical portion each include chuck receiving means located on said axis of rotation to allow said adapter to be held thereat in cantilever fashion while either said first shaft or said second shaft is affixed to said adapter at an opposite cylindrical portion from the cylindrical portion held.

5. The torsional damper assembly of claim 4 wherein:
said bracket means includes a wall perpendicularly arranged to said axis of rotation with said extension extending therethrough, said housing and said annular inertia weight define a cylindrical hole across which said wall extends with said wall located adjacent said flange means of said adapter, said flange means includes a disk shaped flange located outwardly of and between said first cylindrical portion and said second cylindrical portion.

6. The torsional damper assembly of claim 5 wherein:
said extension projects outwardly in a first direction from said flange and has a first termination adjacent said first cylindrical portion, said first cylindrical portion extends into said first shaft limiting lateral motion therebetween with said first shaft welded to said first termination limiting longitudinal motion therebetween; and,
said second cylindrical portion extends outward in a direction opposite to said first direction and into said second shaft limiting lateral motion therebetween and is welded to said second shaft limiting longitudinal motion therebetween.

7. An adapter for mounting a torsional damper between a first shaft and a second shaft to attenuate shaft vibration and noise comprising:
  flange means directly attachable to a torsional damper to secure said adapter to said damper and limit motion therebetween;
  first mounting means integral with said flange means and directly engageable with a first shaft to fixedly secure said adapter to said first shaft to limit longitudinal and lateral motion therebetween; and,
  second mounting means integral with said flange means and directly engageable with a second shaft to fixedly secure said adapter to said second shaft to limit longitudinal and lateral motion therebetween.

8. The torsional damper assembly of claim 7 wherein:
said first mounting means includes a first cylindrical portion and said second mounting means includes a second cylindrical portion integrally attached to said first cylindrical portion and aligned along the same axis of rotation with said first cylindrical portion extendable into said first shaft and said second cylindrical portion extendable into said second shaft.

9. The torsional damper assembly of claim 8 wherein:
said adapter further includes an extension located integral with and between said first cylindrical portion and said flange means, said extension is sized to receive said damper between said first cylindrical portion and said flange means with said damper extending circumferentially around said extension.

10. The torsional dampe assembly of claim 9 wherein:
said first cylindrical portion and said second cylindrical portion each include chuck receiving means located on said axis of rotation to allow said adapter to be held thereat in cantilever fashion while either said first shaft or said second shaft is affixed to said adapter at an opposite cylindrical portion from the cylindrical portion held.

11. The torsional damper assembly of claim 10 wherein:
said flange means includes a disk shaped flange located outwardly of and between said first cylindrical portion and said second cylindrical portion, said extension projects outwardly in a first direction from said flange which has a first termination adjacent said first cylindrical portion, said first cylindrical portion extends into said first shaft limiting lateral motion therebetween with said first shaft welded to said first termination limiting longitudinal motion therebetween; and,
said second cylindrical portion extends outward in a direction opposite to said first direction and into said second shaft limiting lateral motion therebetween and is welded to said second shaft limiting longitudinal motion therebetween.

12. A shaft assembly having dampened shaft vibration and noise comprising:
  a first shaft;
  a second shaft aligned with said first shaft and rotatable therewith about an axis of rotation;
  a housing having a ring shaped sealed cavity;

an annular inertia weight rotatably mounted in said cavity in unattached, concentric and slidable relationship therewith and defining a clearance therebetween;

bearing means retained between said housing and said inertia weight and within said clearance to function as a medium to dampen shaft torsional vibration and noise;

bracket means attached to said housing and located radially inward of said cavity and said annular weight; and, an adapter having a one piece main body which includes:

flange means directly attachable to said bracket means and to secure said adapter to said housing and limit motion therebetween;

first mounting means integral with said flange means and mounted directly to said first shaft fixedly securing said adapter to said first shaft to limit longitudinal and lateral motion therebetween; and, second mounting means integral with said flange means and directly mounted to said second shaft fixedly securing said adapter to said second shaft to limit longitudinal and lateral motion therebetween.

13. The assembly of claim 12 wherein:

said first mounting means includes a first cylindrical portion and said second mounting means includes a second cylindrical portion integrally attached to said first cylindrical portion and aligned along the same axis of rotation with said first cylindrical portion extending into said first shaft and said second cylindrical portion extending into said second shaft.

14. The torsional damper assembly of claim 13 wherein:

said adapter further includes an extension located integral with and between said first cylindrical portion and said flange means, said extension is sized to receiving said housing between said first cylindrical portion and said flange means with said housing extending circumferentially around said extension.

15. The torsional damper assembly of claim 14 wherein:

said bracket means includes a wall perpendicularly arranged to said axis of rotation with said extension extending therethrough, said housing and said annular inertia weight define a cylindrical hole across which said wall extends with said wall located adjacent said flange means of said adapter, said flange means includes a disk shaped flange located outwardly of and between said first cylindrical portion and said second cylindrical portion.

* * * * *

UNITED STATES PATENT AND TRADEMARK OFFICE
CERTIFICATE OF CORRECTION

PATENT NO. : 4,884,666

DATED : December 5, 1989

INVENTOR(S) : Carl R. Stahl

It is certified that error appears in the above-identified patent and that said Letters Patent is hereby corrected as shown below:

In column 3, line 56, "7" should read "27"

Signed and Sealed this

Sixteenth Day of April, 1991

Attest:

HARRY F. MANBECK, JR.

Attesting Officer

Commissioner of Patents and Trademarks